United States Patent [19]

Citron et al.

[11] Patent Number: 5,432,926
[45] Date of Patent: Jul. 11, 1995

[54] METHOD AND APPARATUS FOR IMPROVING DATABASE RELIABILITY AND RESPONSE TIME IN A DISTRIBUTED TRANSACTION PROCESSING SYSTEM

[75] Inventors: Andrew P. Citron, Raleigh; James P. Gray, Chapel Hill, both of N.C.

[73] Assignee: International Business Machines Corporation, Armonk, N.Y.

[21] Appl. No.: 985,391

[22] Filed: Dec. 4, 1992

[51] Int. Cl.⁶ .............................................. G06F 11/00
[52] U.S. Cl. .................................................. 395/575
[58] Field of Search ....................... 395/575, 600, 650; 364/285.2, 285; 371/20.1

[56] References Cited

U.S. PATENT DOCUMENTS

| | | | |
|---|---|---|---|
| 4,648,031 | 3/1987 | Jenner | 364/200 |
| 5,258,982 | 11/1993 | Britton et al. | 370/110.1 |
| 5,261,089 | 11/1993 | Coleman et al. | 395/600 |
| 5,276,876 | 6/1994 | Coleman et al. | 395/150 |

OTHER PUBLICATIONS

"Notes on Database Operating Systems," published in Operating Systems–An Advanced Course; Lecture Notes in Computer Science; vol. 60, Springer-Verlag, 1978, by J. N. Gray.
IBM's LU6.2 Reference: Peer Protocols (SC31-6808).

*Primary Examiner*—Charles E. Atkinson
*Assistant Examiner*—Joseph E. Palys
*Attorney, Agent, or Firm*—Jerry W. Herndon

[57] ABSTRACT

A transaction network in which, in appropriate cases, a transaction is allowed to complete at each node and new work to commence, before all transaction resources at the node actually complete a syncpoint operation. This desirable result is obtained without the risk of unreported database corruption. At each node in response to a prepare to commit syncpoint command from a parent node, the node in question determines if it or any of its descendant nodes can make a unilateral heuristic decision to commit or backout the transaction irrespective of whether or not the final syncpoint command is to commit or backout. Each node informs its parent node that it is reliable or unreliable. Reliable means that neither this node nor any of its descendant nodes can make a unilateral heuristic decision. Unreliable means that this node or one or more of the descendant nodes may make such a unilateral decision. If a node is reliable, the transaction is released at the node after receiving and propagating to descendant nodes the final commit or backout command and before completion or acknowledgement of completion of the commit or backout command by the node or any of its descendant nodes. If the node is unreliable, then it waits for acknowledgement of completion of the commit or backout syncpoint operation at all unreliable nodes, including itself, before releasing the transaction at the node.

15 Claims, 7 Drawing Sheets

AGREE/NOT AGREE MESSAGE

| LUWID 800 | ID 802 | A 804 | REL 806 | |
|---|---|---|---|---|

METHOD AND APPARATUS FOR IMPROVING DATABASE RELIABILITY AND RESPONSE TIME IN A DISTRIBUTED TRANSACTION PROCESSING SYSTEM

TECHNICAL FIELD

The invention is related to database and transaction processing systems generally and to distributed systems which use two-phase commit and backout protocols to insure that database consistency is maintained. In particular, the invention relates to improving the reliability of a distributed database, that is, the probability of maintaining a noncorrupted database, while also improving the response time required to process transactions. This is accomplished, in appropriate cases, by treating transactions as completed without waiting for transaction commit acknowledgements from the distributed resources that are performing transaction operations responsive to a COMMIT request. The invention allows other work to proceed quickly without waiting for the acknowledgements. This is accomplished, while still insuring that a COMMIT syncpoint operation will be properly completed by all resources, even in the event of an interim fault or failure. In systems in which transaction application programs rely on transaction managers (also called syncpoint managers) for guaranteed syncpoint processing, it allows a syncpoint manager, in appropriate cases, quickly to inform a transaction program that a COMMIT operation has been completed, before acknowledgements to the COMMIT have been received from each of the distributed resources. This, in turn, allows the transaction programs to proceed with new work as quickly as possible. All this is accomplished without sacrificing the reliability and integrity of the distributed database.

BACKGROUND OF THE INVENTION

Prior art two-phase syncpoint protocols control operations between resources in distributed transaction systems. These protocols are designed to insure that database consistency is maintained even in the face of failures; that is, the protocols insure that transactions either commit or are backed-out by all resources at all nodes of a system.

These protocols are designed to insure that database consistency is maintained even in the face of failures. The sequence of events in a typical two-phase protocol system to perform a syncpoint operation usually takes the following form, simplified for this preliminary discussion. A transaction program at one of the system nodes makes a request to its syncpoint manager to commit or backout a transaction. This syncpoint manager becomes the syncpoint initiator for this transaction. Assuming that the transaction program requested a commit operation, the syncpoint manager transmits a PREPARE TO COMMIT command to each of the resources known to it that is involved in the transaction. These resources include resources, such as a database manager at the syncpoint initiating node, any similar local resources, and resources such as local logical units (LUs) that represent child nodes adjacent to the initiating node that are also involved in the transaction. The PREPARE TO COMMIT command requests these resources to prepare to commit the transaction. The nodes receiving the PREPARE TO COMMIT command perform whatever operations are necessary to respond to the command. For example, updates in temporary buffers may be written out to stable disk storage. Eventually, the syncpoint initiator receives AGREE or NOT AGREE responses from the resources to the PREPARE TO COMMIT commands. These AGREE or NOT AGREE responses represent a composite answer from all other resources at the other nodes of the system involved in the transaction. If all resources agree to commit, the syncpoint initiator then transmits a COMMIT command to each of its resources, which include syncpoint managers in adjacent child nodes; otherwise, it transmits BACKOUT commands. The syncpoint managers receiving a syncpoint command also propagates the command to its known resources, and so on throughout the network. In most prior art systems, the syncpoint managers then collect FORGET messages from each of its resources and propagate a composite FORGET message upward in the network toward the syncpoint initiator. A FORGET message effectively tells a syncpoint manager that a syncpoint operation such as commit was performed satisfactorily by the resources that descend in the system from the syncpoint manager. Assuming that all FORGET messages are collected by an intermediate syncpoint manager in the network and that all indicate that a syncpoint operation was performed successfully, then the typical syncpoint manager informs its transaction program that the syncpoint operation was completed successfully. As a result, the transaction program releases resources which have been locked during the transaction and proceeds with new work. Eventually, the syncpoint initiator receives the composite FORGET messages from its resources and it also releases its transaction program as a result thereof.

When a syncpoint initiator has commanded all other agent resources to commit a transaction, it is still possible for an agent unilaterally to decide to backout its part of the transaction. This usually occurs in situations in which a failure of some type prevents the agent resource from actually completing the commit operation in a timely fashion. While the operation will eventually commit when the failure is cleared, if no unilateral decision intervenes, the time required for this to occur is indefinite. In the meantime, in the typical system, the syncpoint managers at each of the nodes are waiting for FORGET messages from their resources before releasing their transaction programs to begin new work. To prevent the possibility of such intolerable delays at a node that is tied up because of another node or resource, some systems are designed simply never to wait for FORGET messages; such systems assume that a COMMIT will be satisfactorily completed and the transaction programs are released as a matter of course immediately after a decision is made to commit. As an aside, the same problems of heuristic decisions apply to backout syncpoint commands. After sending a PREPARE TO COMMIT, followed by the receipt of a DISAGREE from some resource, and the resultant transmission of a BACKOUT command, there is still the possibility that an unreliable resource will unilaterally commit. The strategy of ignoring the possibility of a unilateral heuristic decision by a resource invites the possibility of database corruption, because it allows transaction programs to begin new work, in spite of the fact that there is always the possibility (due to a heuristic decision) that the transaction may be backed out at one or more nodes, even after a COMMIT command. A heuristic decision is a manual or automatic intervention at a node to force a transaction to commit or back-out at that node, irrespective of the syncpoint operation at other nodes. Such heuristic decisions occur usually because of some condition, such as a failure, that prevents the node or resource from completing a syncpoint in a timely fashion. The heuristic decision is unilateral and, in effect, says 'commit' and go on, irrespective of anything else, or 'backout' and go on, irrespective of anything else. While a heuristic decision forces a transaction to continue, it can also cause database corruption. Corruption can occur, for example, if a node unilaterally elects to backout, while all other nodes commit, or vice versa, a node unilaterally commits, while all other nodes backout. Database corruption caused by such heuristic decisions refers to damage, such as data inconsistencies across the distributed database, that is not reported to the transaction programs and thus remains in the system indefinitely. Such database damage can be repaired only by application specific repair programs or backup recovery operations.

To summarize the above, to prevent the possibility of database corruption, conventional practice in typical systems requires that syncpoint managers wait until all of its agent resources complete a commit or back-out and communicate this fact to the syncpoint manager. At that time, the syncpoint manager safely releases the transaction program that requested the syncpoint operation. However, as mentioned, this mode of operation limits throughput based on the slowest or most overloaded system nodes. Moreover, on a given transaction, if a failure or excessive delay occurs at one of the nodes, the transaction will not be able to complete at other nodes and resources at those nodes remain locked. Users suffer because their transaction requests backup waiting for resources that are locked on the present transaction. The results of these problems are reduced throughput in normal operation, due to wait time for commit/back-out acknowledgements, and occasional transaction delays ranging from undesirable to intolerable. Some other systems simply ignore the possibility of heuristic decisions at a node and release their transaction programs without waiting for acknowledgements. These systems run the risk of undetected distributed database corruption.

SUMMARY OF THE INVENTION

The invention allows a transaction to complete at a node and new work to commence in appropriate cases, before all descendant resources actually complete a commit or backout syncpoint operation. This desirable result is obtained without the risk of unreported database corruption.

A distributed transaction network has a plurality of nodes with each being capable of performing some operation on a transaction. At each node in response to a prepare to commit syncpoint command from a parent node, the node in question determines if it or any of its descendant nodes can make a unilateral heuristic decision to commit or backout the transaction irrespective of whether or not the final syncpoint command is to commit or backout. Each node informs its parent node that it is reliable or unreliable. Reliable means that neither this node nor any of its descendant nodes can make a unilateral heuristic decision. Unreliable means that this node or one or more of the descendant nodes may make such a unilateral decision. If a node is reliable, the transaction is released at the node after receiving and propagating to descendant nodes the final commit or backout command and before completion or acknowledgement of completion of the commit or backout command by the node or any of its descendant nodes. If the node is unreliable, then it waits for acknowledgement of completion of the commit or backout syncpoint operation at all unreliable nodes, including itself, before releasing the transaction at the node.

Whether a node can make a heuristic decision can be implemented or determined in a number of ways. For example, in most cases, a unilateral decision to commit or backout a transaction at a node, irrespective of the decision to commit or backout by the rest of the network, can be made only by an operator at the node in question. If no interface between the operator and the system is provided in such a system, then there can be no means by which the operator can control such a unilateral decision. If such an interface is provided, then the interface-can be made conditional on parameter information stored at the node. In other words, the means for an operator to force a unilateral decision can be provided, but the possibility of exercising the option can be made dependent on other information stored at the node. And, of course, it is possible to program a node such that it automatically can exercise an option of making a unilateral syncpoint decision in the face of predefined criteria.

The preferred embodiment of the invention is in a system in which application transaction programs request database services, including syncpoint operations, from a syncpoint manager at each of the nodes of the distributed database system. In this system, the syncpoint manager in appropriate cases quickly releases the transaction program after a COMMIT request from the transaction program by returning to the transaction program with a commit successful indication and without waiting for acknowledgements from other resources to the commit operation. Importantly, this is accomplished without incurring the risk of heuristic database damage. A resource contains indicia indicating whether or not a heuristic decision is allowed by the resource. Each resource involved in a database transaction informs its syncpoint manager initiating the transaction whether or not a heuristic decision is allowed by the resource. If every resource involved in a transaction indicates to its syncpoint manager that no heuristic decision is allowable, the syncpoint manager knows that, even if a node failure occurs, conventional resynchronizing operations will eventually lead to database recovery. Therefore, it is safe for the syncpoint manager to release the transaction early after transmitting COMMIT or BACKOUT messages to all resources, without waiting for acknowledgements, or even requiring explicit acknowledgements, from the resources. However, if any resource indicates that a heuristic decision can occur, the database manager waits for commit or backout acknowledgements from all unreliable resources before releasing the transaction. In other words, if any resource says that it is unreliable, then its syncpoint manager, and all of its parent syncpoint managers in the system tree above it, wait for explicit syncpoint acknowledgements indicating the success of the syncpoint operation.

When all resources of a syncpoint manager have stated that they are reliable, and an early transaction release has been made as a result, the receipt of acknowledgements of some kind from the resources are still required. These acknowledgements may take the form of explicit messages, fields in other types of messages or what has come to be called IMPLIED FORGETS. Whatever their form, the FORGETS are used to perform final cleanup work on a transaction, such as to erase database log records that are maintained for backup recovery in the case of intermediate failures. The preferred embodiment of the invention uses the IMPLIED FORGET protocol, which means that the receipt of any message from a resource implies an acknowledgement of an earlier syncpoint command. Since the resource from which the message is received is obviously still operating and since it did not report a failure explicitly to the prior COMMIT or BACKOUT, then it may be 'implied' by the receipt of this unrelated message, that the acknowledgement to the prior syncpoint command has been given. At this point, any final cleanup work to the corresponding syncpoint operation, such as mentioned above, may be performed as if an explicit acknowledgement has been received.

DETAILED DESCRIPTION

A transaction in a database system is a sequence of actions performed to take a set of resources, typically database records, from one consistent state to another in such a way that the transaction appears to be atomic. If a failure occurs during a transaction, the changes made as part of the transaction are backed-out, so that the resources return to the consistent state that existed at the start of the transaction. Otherwise, the changes are committed at all relevant nodes of the system. Two-phase commit protocols are used to control the commit and backout procedures in a distributed database. These protocols insure atomic (transactional) consistency, even in the face of failures. The basic protocols are described in J. N. Gray's "Notes on Database Operating Systems," published in Operating Systems—An Advanced Course; Lecture Notes in Computer Science; Volume 60, Springer-Verlag, 1978. Some variations of these protocols for use in IBM's System Network Architecture (SNA) are described in IBM's LU 6.2 Reference: Peer Protocols (SC31-6808).

For completeness, a SIMPLIFIED two-phase commit protocol will be briefly described with reference to FIG. 1. A more detailed description will be given later. Reference is also made to the above publications for additional details.

Figures 1, 8:
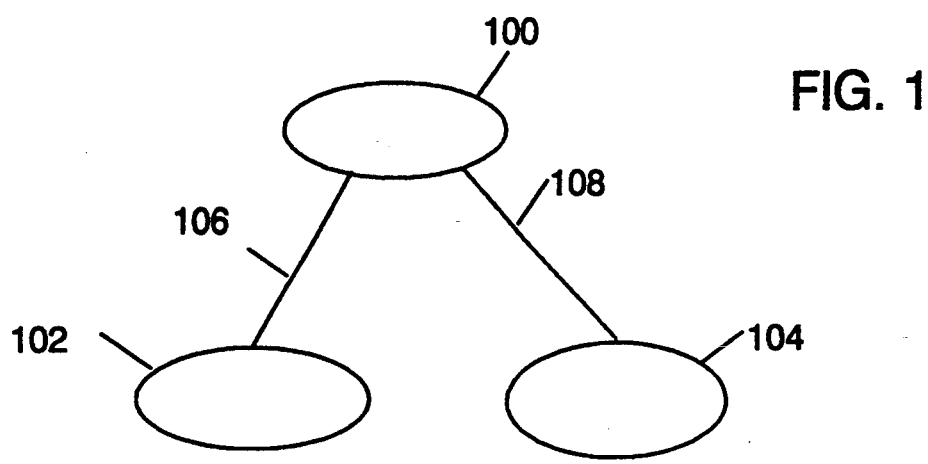
FIG. 1 shows an illustrative example of a simple distributed network involving three interconnected nodes, as one example of a network in which the invention might be practiced.
FIG. 8 shows an illustrative format of an AGREE or NOT AGREE message returned by a resource or a syncpoint manager to its parent in response to a syncpoint command; this message contains a REL ('reliable') flag to indicate that all of the resources that descend in the syncpoint tree from the sender have reported that they are reliable resources in which heuristic decisions are not allowed.

FIG. 1 shows a simple distributed database transaction system consisting of nodes 100, 102 and 104. Each node contains a computer, processor or microprocessor to control the operations of the node. Such computers or microprocessors may be general or special purpose mainframes, smaller processors such as the RISC/6000 workstation marketed by IBM, or even desktop computers. Nodes 100 and 102 are connected by a conversation 106. Nodes 102 and 104 are connected by a conversation 108. If node 100 initiates a syncpoint command, such as a COMMIT, for a present transaction, it becomes the root of the syncpoint tree, with its child nodes being 102 and 104. This means that a transaction program (TP) at node 100 issues a COMMIT command to start a two-phase commit operation. The process at each node that receives the syncpoint command from the TP (or from another node) and performs syncpoint operations is usually called a syncpoint manager (SPM). As a result of the COMMIT command from a TP, the SPM at node 100 sends a PREPARE TO COMMIT message to both nodes 102 and 104, node 100 thereby becoming the commit initiator. Nodes 102 and 104 decide individually if operations have proceeded satisfactorily from their point of view and each return a vote in the form of an AGREE or NOT AGREE message. In the normal case when all operations have proceeded satisfactorily, both nodes 102 and 104 return an AGREE message to node 100. After receiving the AGREE messages, node 100 sends a COMMIT message to nodes 102 and 104 and the data modifications performed at each of the nodes are then made permanent (committed). If either of nodes 102 or 104 returns a NOT AGREE message in response to the PREPARE TO COMMIT, or if node 100 unilaterally decides that it does not agree to the commit, it sends a BACKOUT message to each of nodes 102 and 104 and each node then returns its data to the state that existed at the beginning of the present transaction. After sending a COMMIT or BACKOUT syncpoint command to its child nodes, conventionally a node then waits to receive acknowledgments from its child nodes that the syncpoint operation has, in fact, been successfully completed. These acknowledgements are usually called FORGET messages. When FORGETS are received, the SPMs at each of the nodes conventionally return an indication to the transaction program in question that the syncpoint operation was either successful or unsuccessful. If successful, this causes the TP at a node in question to release resources that are locked on the transaction and to proceed with new work.

As previously mentioned, in appropriate cases, the invention allows the syncpoint managers at the network nodes safely to return to their TPs a successful response to a commit operation before the actual commits have occurred at the various nodes and without waiting for the FORGET acknowledgements. This, in turn, allows the TPs to begin safely to process new work earlier than heretofore possible. 'Safely' is an important word in the previous sentence. As mentioned previously, some prior art systems return successful commit indications to TPs as a matter of course immediately after receiving AGREE messages and sending resultant COMMIT messages to agents, without any effort to account for the possibility that a node might not commit as a result of actions such as a heuristic actions. Such activity can cause database corruption. These prior art systems ignore this possibility and hope for the best. In the invention, the early successful return from an SPM to a TP occurs immediately after the receipt of a COMMIT message from a parent resource and after propagating the COMMIT message to children agents, if all of the children agents have indicated that they are reliable, or as soon as FORGET messages are received from all unreliable agents. 'Agents' means all resources in the same node as the SPM or in nodes below (child, grandchild, etc.) the SPM in question in the syncpoint tree. A 'reliable' indication means that the resource guarantees that if it is told to commit (or backout) the transaction in question, it will eventually commit (or backout) the transaction, with no possibility of unilaterally deciding to do the opposite operation (which would be a heuristic decision). An 'unreliable' resource will allow intervention, typically manual, to force a commit, or a backout, to break some type of logjam, at the discretion of the intervening entity. To gain the knowledge that a resource is 'reliable' or 'unreliable', the AGREE message from each resource to its SPM contains a REL (reliable) field (FIG. 2, 806), the state of which indicates whether the resource guarantees reliability of it and its agents, or not. The AGREE message from an SPM to its parent SPM in the syncpoint tree contains a similar REL field which is a composite indication of the reliability of all of the agents of the responding SPM. In other words, an SPM responds that it is reliable to its parent SPM only if all agents of the responding SPM have indicated that they are 'reliable'. Otherwise, an SPM responds 'not reliable' to its parent SPM. An SPM that has only reliable agents will make an early return to its TP immediately after receiving the AGREE message from the agents with the corresponding REL flags set and sending resultant COMMIT messages. It will then collect IMPLIED FORGET messages from these agents. An IMPLIED FORGET is the receipt of the next message from an agent, which implies that the last syncpoint operation has, by implication, been completed. Any SPM who has an agent that is not reliable will receive an AGREE (or NOT AGREE) message with the REL flag reset and as a result will not make the early return to its TP until it has collected a FORGET from that agent and each other unreliable agent. At that point, it will make a successful return to the TP. IMPLIED FORGET messages will be collected from all of the 'reliable' agents as new messages arrive from these agents. Thus, even when 'unreliable' agents exist, a successful return will be made to a TP as early as possible, i.e., when explicit FORGETS have actually been collected from all 'unreliable' agents.

The invention is described in terms of IBM's SNA logical unit (LU) 6.2 architecture, although it will be apparent that the invention is not limited to this environment, but can be adapted to other variations of two-phase commit protocols.

Figure 2:
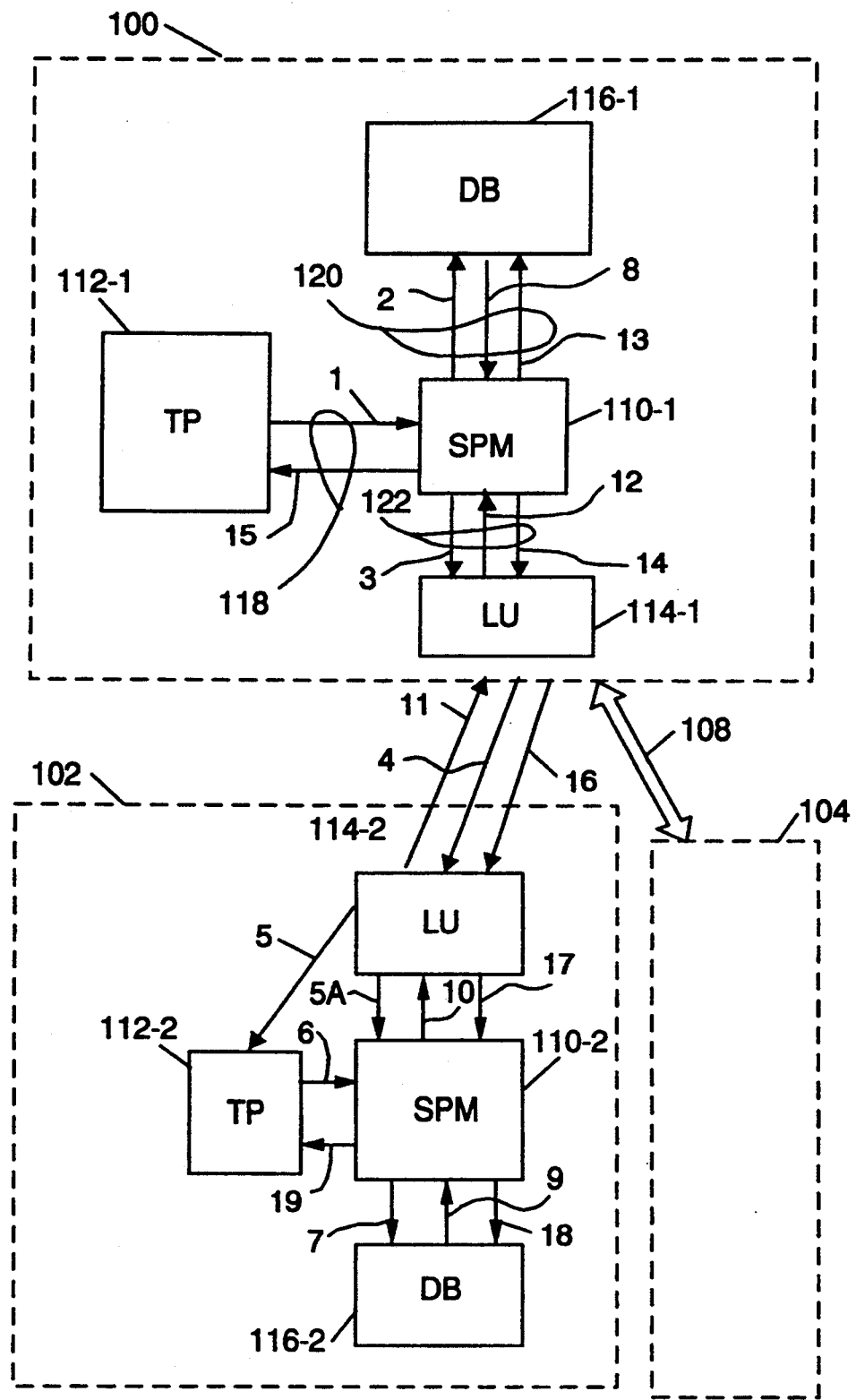
FIG. 2 shows a more detailed illustration of the network of FIG. 1, in which illustrative transaction programs, syncpoint managers and resources in each node are shown. In addition, an illustrative sequence of message flows between the various node entities are shown as an aid to an understanding of the invention.

FIG. 2 shows the network of FIG. 1 in more detail. The elements of a node are assumed to be essentially identical, so only the elements of nodes 100 and 102 are shown. Each node contains an SPM 110, at least one transaction program (TP) 112, a resource such as database 116 and a logical unit (LU) 114 by means of which a node can Communicate with other nodes. While FIG. 2 shows one TP at each node, it should be understood that in the general case, a node may contain multiple TPs all interacting amongst themselves and other nodes via LUs to effect resource transactions. Resources may be viewed as including virtually anything available at a node for use by a TP, such as local files and devices. However, to simplify this discussion as much as possible, the primary resources will be considered to be only databases and LUs.

SPMs and LUs, in conjunction with each other, execute verb commands that allow the local TPs to participate in and control distributed transactions. Some commands allow one TP to send or receive data to or from another TP. Other commands are the syncpoint commands already mentioned. The SPMs execute syncpoint commands to commit or backout a transaction at all nodes on request of a TP. Reference is made to IBM publication TRANSACTION PROGRAMMER'S REFERENCE MANUAL FOR LU 6.2, GC30-3084 for a detailed description of the LU 6.2 verbs. Reference is made to IBM publication SC30-3269, FORMAT AND PROTOCOL REFERENCE MANUAL for a detailed description of the operations of LUs. Both of these publications are incorporated by reference herein. As seen, an SPM is somewhat at the center of operations of a node. It receives commands from and communicates results to TP by communication path 118. Similarly, an SPM communicates with a DB and an LU via paths 120 and 122, respectively.

Figure 3:
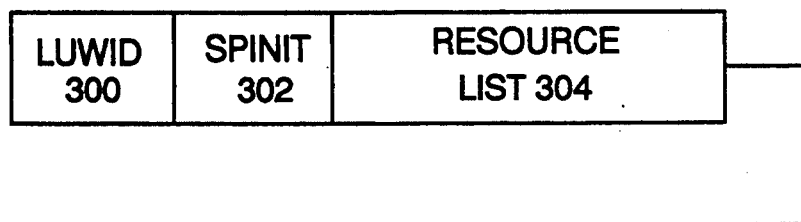
FIG. 3 shows an illustrative format of a data structure maintained by the syncpoint manager at each node of a distributed network, such as shown in FIG. 1, for a particular database transaction. The illustrative data structure includes a TRANSACTION CONTROL BLOCK. The TRANSACTION CONTROL BLOCK contains a LUWID (Logical Unit of Work Identifier), which contains a unique number identifying this specific transaction, a SPINIT (syncpoint initiator) field which if set identifies the syncpoint manager at the node in question as the manager at the top of the syncpoint tree, and a RESOURCE LIST POINTER that points to a RESOURCE CONTROL BLOCK; the RESOURCE CONTROL BLOCK contains a separate entry for each resource of the syncpoint manager at the node in question that is involved in this specific transaction; each entry in the RESPORCE CONTROL BLOCK associated with a separate resource contains an ID field which identifies the resource, an AGENT field that if set indicates that this resource is an agent of the syncpoint manager (below it in the syncpoint tree) and if reset indicates that the resource is the parent resource of the syncpoint manager (above it in the syncpoint tree), a REL (reliable) field which if set indicates that all this resource and its agents have responded that they are 'reliable' (will never allow a heuristic decision), an implied forget field IF, which if set means not to wait for an explicit FORGET message from this resource, and a DONE field which is used in conjunction with the IF field to determine if and when a transaction may be completed early according to the invention.

FIG. 3 shows an illustrative data structure that is maintained by an SPM at each node for each database transaction with which it is associated. A TRANSACTION CONTROL BLOCK contains an entry for each transaction with which the SPM is associated. Only one such entry is shown in FIG. 3. Each entry of the TRANSACTION CONTROL BLOCK contains a logical unit of work identifier (LUWID) 300 which uniquely identifies this transaction. The state of the SPINIT (syncpoint initiators) field 302 identifies whether or not this SPM is the syncpoint initiators of this transaction. Each TRANSACTION CONTROL BLOCK entry also contains a pointer 304 to a RESOURCE CONTROL BLOCK. The RESOURCE CONTROL BLOCK contains an entry for each resource that is an agent of the SPM in question that is involved with this transaction. Thus, for example, in FIG. 2, LU 114-1 and DB 116-1 are the agents of SPM 110-1 and will have entries in the RESOURCE CONTROL BLOCK for this transaction. Because they are agents, their respective AGENT flags 316 are set in the RESOURCE CONTROL BLOCK. Because LU 114-1 is the conduit by means of which SPM 110-1 communicates with node 102 in this example, then effectively, the resources in node 102 become agents of SPM 110-1, although SPM does not know anything specific about these agents. The RESOURCE CONTROL BLOCK also contains an entry for a parent, as opposed to an agent, resource. The SPM at the top of the physical network tree has no parent and no such entry. However, in node 102, for example, LU 114-2 is the representative for the parent node 100. Thus, there is a entry for LU 114-2 in the RESOURCE CONTROL BLOCK for node 102 and its AGENT flag 316 is reset to zero to indicate that it is a parent resource. Each RESOURCE CONTROL BLOCK entry also contains a number of fields. An ID field 306 identifies the resource. The IF (IMPLIED FORGET) field 310 is set in an entry when it becomes known that this resource is expected to acknowledge a syncpoint command to its parent node with an IMPLIED FORGET message. The REL (reliable) field 312 is set for an entry if and when it becomes known that under no circumstances will this resource allow a heuristic operation to occur on this transaction. The DONE field 314 is set in an entry when it becomes known at an appropriate point that the related resource is reliable or, if not reliable, the SPM has received an explicit FORGET message from the agent. This field controls the early return to a TP, as will become apparent.

In accordance with the invention, FIGS. 4 through 7 show the method steps that are carried out by the SPM at each node in response to a syncpoint command from an initiating TP or a PREPARE TO COMMIT message propagated from an SPM that has initiated a syncpoint command. FIG. 2 shows the illustrative syncpoint message flows between nodes and elements within the nodes for this example. For the purpose of identifying an illustrative sequence of the flows, the nomenclature used in FIG. 2 is N. (where N is a sequence number representing the sequential order of a given message or command flow). Also for this example, it is assumed that all resources are reliable; that is, that all guarantee that no heuristic action will be allowed by each resource. Table 1 lists the commands for each of these illustrative flows shown in FIG. 2.

TABLE 1

The sequence numbers below refer to flows illustrated in FIG. 2
1. COMMIT from initiating TP to SPM.
2. PREPARE TO COMMIT from SPM syncpoint initiator to resource DB 116-1.
3. PREPARE TO COMMIT from SPM syncpoint initiator to resource LU 114-1.
4. PREPARE TO COMMIT propagated from LU 114-1 to LU 114-2.
5. TAKE SYNCPOINT from LU 114-2 to TP 112-2 (in response to 4.).
5A. PREPARE TO COMMIT from LU 114-2 to SPM 110-2.
6. COMMIT from TP 112-2 to SPM 110-2 (in response to 5.).
7. PREPARE TO COMMIT from SPM 110-2 to agent DB 116-2.
8. AGREE from DB 116-1 to SPM 110-1 (in response to 2.).
9. AGREE (with REL=1) from DB 116-2 to SPM 110-2 (in response to 7.).
10. AGREE from SPM 110-2 to parent LU 114-2 with REL=1 (in response to 9.).
11. AGREE (REL=1) propagated from LU 114-2 to LU 114-1 (in response to 10.).
12. AGREE (REL=1) propagated from LU 114-1 to SPM 110-1 (in response to 11.).
13. COMMIT from SPM 110-1 to DB 116-1 (because all agents agree).
14. COMMIT from SPM 110-1 to agent LU 114-1 (because all agents agree).
15. Early return code from SPM 110-1 to TP 112-1 (because all agents are reliable).
16. COMMIT propagated by LU 114-1 to LU 114-2 (in response to 14.).
17. COMMIT from LU 114-2 to SPM 110-2 (in response to 16.).
18. COMMIT from SPM 110-2 to DB 116-2 (in response to 17.).
19. Early return code from SPM 110-2 to TP 112-2 (because DB 116-2 is reliable).

Figure 4:
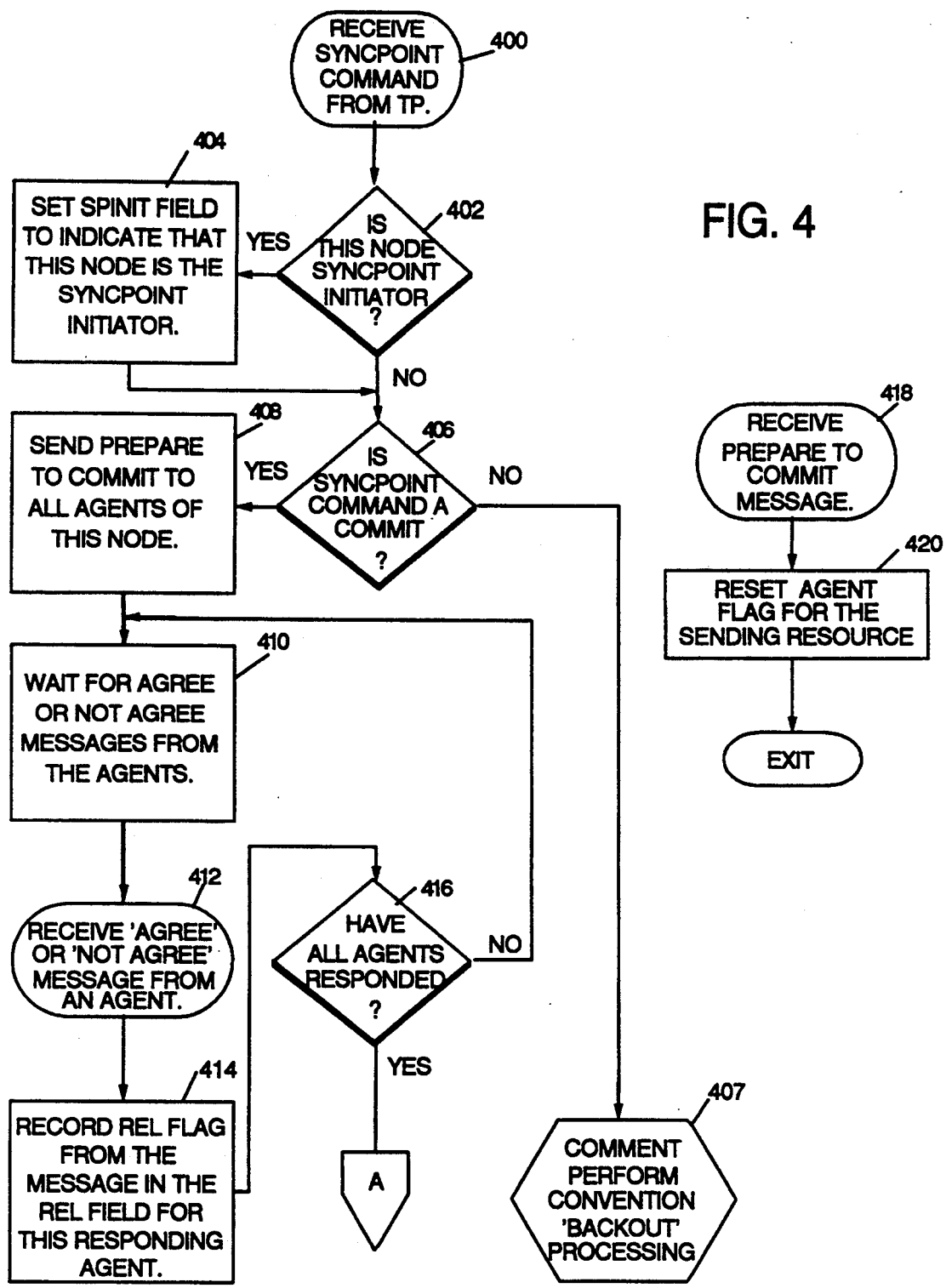
FIGS. 4 through 7 show flowcharts of an illustrative program performed by the syncpoint manager at each node in accordance with the invention.
Figure 5:
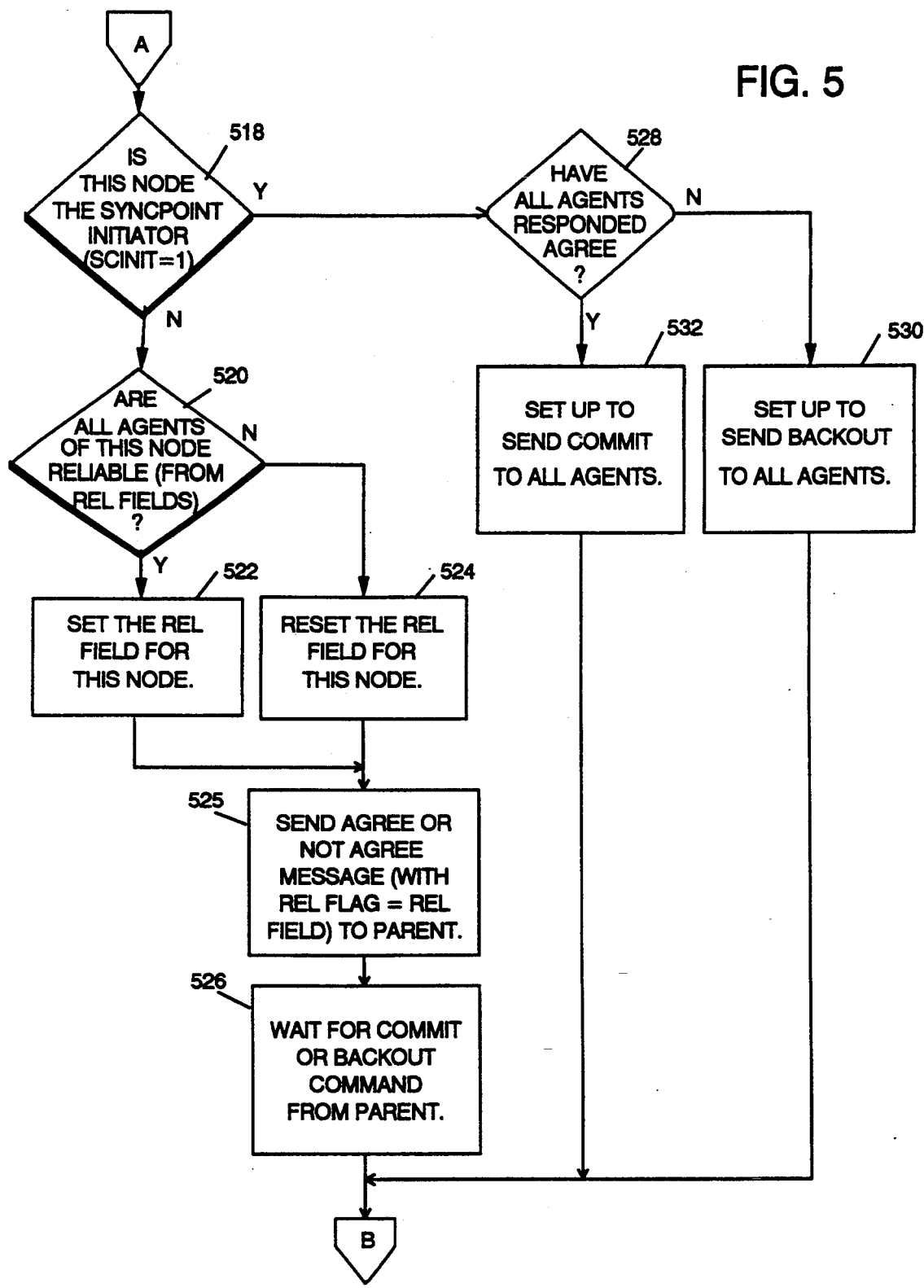
Figure 6:
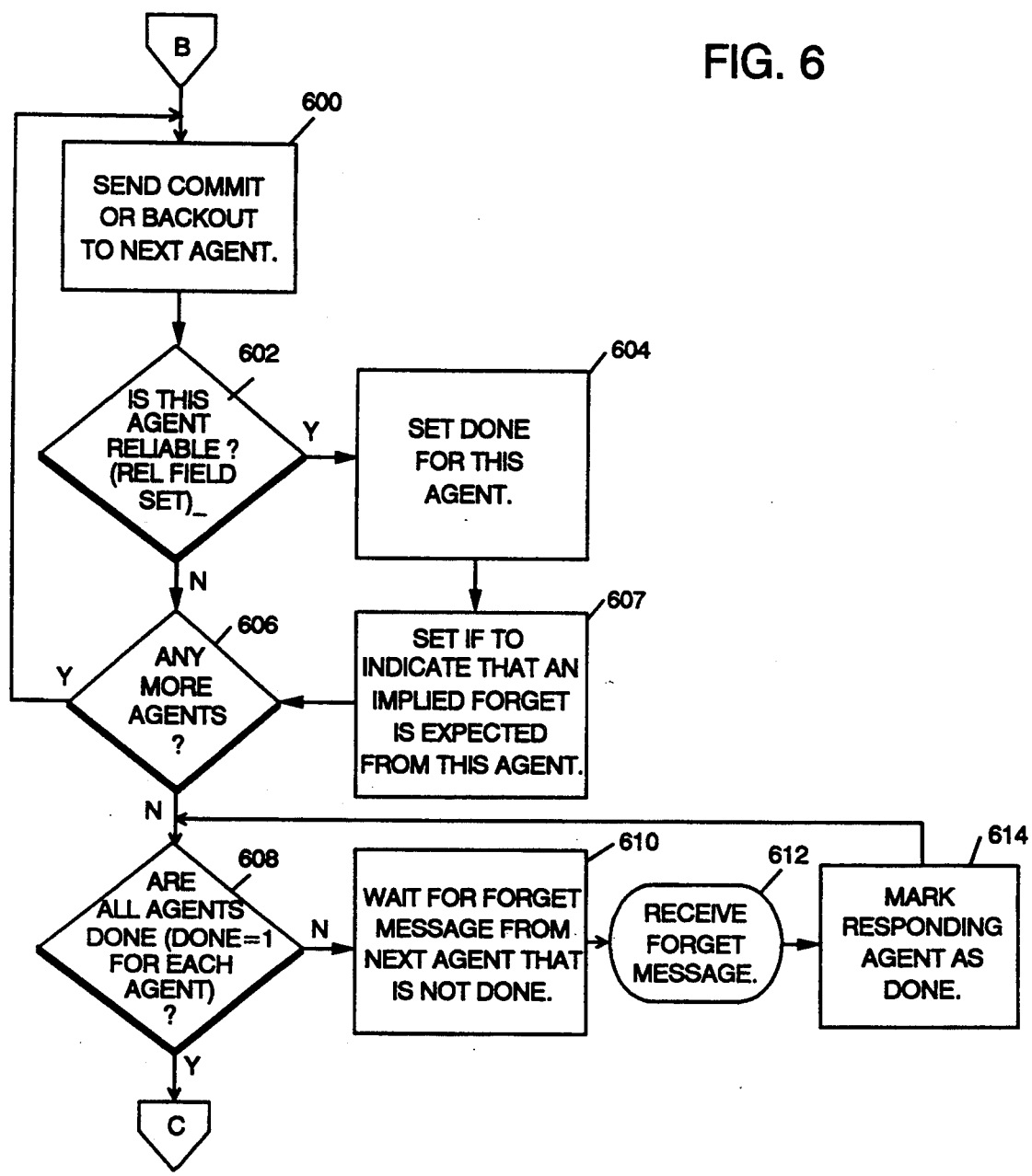
Figure 7:
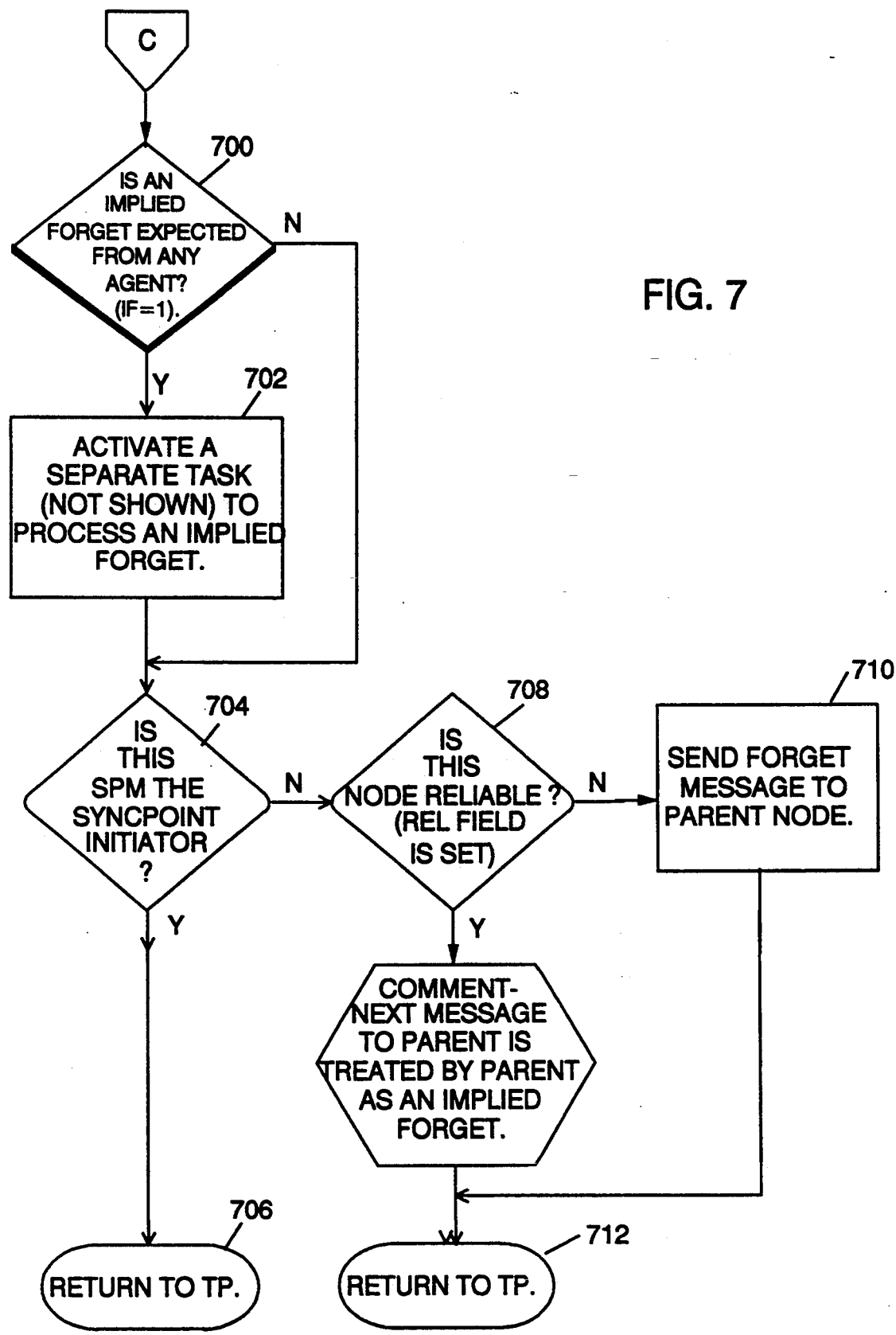

The flowcharts in FIGS. 4 through 7 shown the illustrative steps that are executed by the SPMs at each network node. With reference to FIG. 4, entry point 400 is entered when an SPM at a node receives a syncpoint command (COMMIT or BACKOUT) from a TP (sequence 1. in FIG. 2 and Table 1). For purposes of this discussion, it is assumed that the initiating TP is 112-1 in FIG. 2. Therefore, at this point. SPM 110-1 is executing these steps in response to the command. All agent SPMs of SPM 110-1 will eventually receive COMMIT commands, as will be discussed below, from their respective TPs as a result of this initial COMMIT command at node 100. Because of this, step 402 determines if the SPM receiving this syncpoint command from its TP is the syncpoint initiator. It does this by searching the AGENT flags 316 in its RESOURCE CONTROL BLOCK. If any AGENT flag is set, this means that the corresponding resource has received a PREPARE TO COMMIT command at some point in the past. This means that this SPM is not the syncpoint initiator. How the AGENT flags are administered for each resource in a RESOURCE CONTROL BLOCK will be discussed shortly. If this SPM is the syncpoint initiator, the associated TP is the initiating TP and step 404 sets the SPINIT field 302 to reflect this. Step 406 next determines if the syncpoint command is a COMMIT or a BACKOUT. If the command is a BACKOUT, the program proceeds conventionally to perform the BACKOUT. BACKOUT operations at this point of the description form no part of the invention and are not described further. This is conceptually illustrated at step 407 of FIG. 4. If the command is a COMMIT, step 408 proceeds to send a PREPARE TO COMMIT message to each resource listed in the RESOURCE CONTROL BLOCK. In this simplified example, PREPARE TO COMMIT messages are sent to DB 116-1 and LU 114-1 (2. and 3. in FIG. 2 and Table 1). The message to LU 114-1 is merely propagated onward (4. in FIG. 2) to LU 114-2. LU 114-2 recognizes the PREPARE TO COMMIT message as such and as a result sends a TAKE SYNCPOINT command (5.) to TP 112-2. In addition, LU 114-2 also forwards the PREPARE TO COMMIT command to SPM 110-2 (sequence 5A in FIG. 2 and Table 1).

The PREPARE TO COMMIT command arrives at an SPM via program entrance step 418 in FIG. 4. The identity of the sending resource (LU 114-2) is appended to the PREPARE TO COMMIT message from LU 114-2. By way of example, the AGENT flags 316 are always set at the beginning of a transaction. Step 420 resets the AGENT flag for this sending resource LU 114-2 in the RESOURCE CONTROL BLOCK. Thus, the AGENT flags for the remaining resources in the RESOURCE CONTROL BLOCK remain set until and unless they are reset as a result of the receipt of a PREPARE TO COMMIT message from such an agent. As seen above, with respect to step 402, the AGENT flag for all resources is the mechanism by which an SPM determines if it is the initiating SPM.

In response to the TAKE SYNCPOINT message 5., TP 112-2 may do any number of things to prepare for the syncpoint; if it successfully prepares for the syncpoint, it eventually sends a COMMIT command (6. in FIG. 2) to its SPM 110-2. The steps of FIGS. 4 through 7 are also executed in SPM 110-2 in response to this COMMIT message. In particular, step 402 determines that the SPM has previously received a PREPARE TO COMMIT message on this transaction. Therefore, TP 112-2 is determined not to be the initiating TP and step 404 is not executed by SPM 110-2 in this example. In the same manner as discussed for SPM 110-1, SPM 110-2 proceeds to send PREPARE TO COMMIT messages to the resources in its RESOURCE CONTROL BLOCK. This corresponds only to sequence 7. in this example, because DB 116-2 is the only agent of SPM 110-2 in this example. Similar operations are carried out in node 104.

All SPMs in the nodes now wait for AGREE or NOT AGREE messages from their agents in response to the PREPARE TO COMMIT messages. This is reflected at step 410 of FIG. 4. In node 102, SPM 110-2 is waiting for a response from only DB 116-2. In node 100, SPM 110-1 is waiting for responses from DB 116-1 and LU 114-1. Execution of the program proceeds at 412 in each SPM when such a response is received from an agent. In this example, it is assumed that all responses are AGREE. These messages are shown as 8.A in node 100 and 9.A in node 102.

As an aside, if it were the case that any resource in the network disagreed with the PREPARE TO COMMIT, this fact would cause the transmission of a DISAGREE message upward through the network to the syncpoint initiator. And this would eventually lead to the decision of the syncpoint initiator to initiator a backout command.

As previously mentioned, the AGREE messages contain a flag REL which indicates whether or not the responding agent and its agents are reliable or not reliable. That is, whether or not it is possible for the agent or one of its agents to unilaterally commit or backout irrespective of whether it has disagreed or agreed with the PREPARE TO COMMIT. Step 414 records the state of the REL flag in the REL field 312 of the RESOURCE CONTROL BLOCK at each SPM when a response is received. Step 416 next determines if all agents of the respective SPM have responded to the PREPARE TO COMMIT. In node 102, once DB responds, the answer is yes and SPM 110-2 proceeds to step 518 in FIG. 5. In node 102, step 518 determines if it is the syncpoint initiator. Since it is not, it proceeds to step 520 and determines, by examining the state of the REL flag for all its agents (DB 116-2) if all agents are reliable. If so, node 102 forms it AGREE message at step 522 and sends it to node with the REL flag set to 1 (reliable). If not, step 524 forms and sends the message with the REL flag set to 0 (not reliable). Node 102 then proceeds to wait for a final COMMIT or BACKOUT command from the syncpoint initiators (node 100). In node 100, SPM 110-1 executes the same steps to collect the AGREE or NOT AGREE response from DB 116-1 and the composite response from node 102 via LU 114-1. When all these agents have responded at step 416 in node 100, step 518 determines that node 100 is the syncpoint initiator and proceeds with step 528. The sequence of steps is different here in the syncpoint initiator because this node has no parent to which it must respond. This node has the responsibility of collecting all the AGREES or NOT AGREES of agents and initiating phase two of the protocol, COMMIT or BACKOUT to the agents. Thus, step 528 determines if all of its agents have responded AGREE to the earlier PREPARE TO COMMIT. If the answer is NO, step 530 sends BACKOUT to each of its agents. However, since it is assumed that all agents agreed, step 532 sets up to send a COMMIT message to the agents. Step 600 in FIG. 6 sends such a COMMIT message to the first agent in the RESOURCE CONTROL BLOCK. Now the process of determining whether or not an early return can be made to the TP is begun. Step 602 determines from the REL field for this agent if the agent is reliable. If the present agent is 'reliable' at step 602, the DONE flag 314 is set for the present agent in the RESOURCE CONTROL BLOCK at step 604; step 607 sets the IF field 310 to indicate that an IMPLIED FORGET message is expected eventually from this agent. Step 606 loops to process remaining agents, if any. If the answer is 'not reliable' at step 602, step 606 merely loops to the next agent, if any. Step 608 is executed when COMMIT or BACKOUT has been sent to all agents of this syncpoint originator node. These message flows are represented as sequences 14. and 15. in FIG. 2. Step 608 now determines if DONE 314 is set for all agents. DONE will be set for all agents that responded 'reliable' (step 604). A FORGET must be collected from each agent that responded 'not reliable'. This is the purpose of steps 610, 612 and 614. Step 610 waits for the receipt of a FORGET message from any one of the agents. The message expected is an explicit FORGET, rather than an IMPLIED FORGET, because the SPM needs to know if the resource experienced a heuristic action and performed a backout, when a commit was requested, or performed a commit when a backout was expected. Step 612 represents the receipt of such a FORGET message. Step 614 sets the DONE field 314 for the responding agent and this loop continues until at step 608 all agents of this SPM are marked as DONE. At this time, execution continues with step 700 in FIG. 7, which determines if an IMPLIED FORGET message is expected from any agent. This is determined by interrogating the state of the IF field 310. An IMPLIED FORGET is expected from any agent that replied that it was 'reliable'. In this case, step 702 activates a separate task to act on these IMPLIED FORGETS. This separate task is not shown, as it represents conventional practice in earlier two-phase commit protocols in which IMPLIED FORGETS are used for purposes other than the present invention. The purpose of the separate task collecting IMPLIED FORGETS is merely to perform the same cleanup work that is performed on receipt of an explicit FORGET. These operations form no part of the invention and are not described further.

Next, step 704 determines from SPINIT 302 if the SPM executing this step at this time is the syncpoint initiator. If it is, it has no parent SPM to which it may owe a next message or response. Therefore, this SPM returns to its TP at step 706. This actually means returning a message (or a procedure call) to the TP with a 'transaction successful' return code. This message releases the TP from the present transaction and allows it to proceed with new work, in accordance with the invention. If this SPM is not the syncpoint initiator, for example SPM 110-2 in this example, then the SPM may owe a FORGET message to its parent in the syncpoint tree (SPM 110). Therefore, step 708 determines from the REL field if this SPM earlier responded 'reliable' to the parent SPM. If so, a successful return is made to the TP at this node, thereby releasing the TP in accordance with the invention. An IMPLIED FORGET will be used to cleanup operations in the parent SPM. However, if this SPM earlier replied 'not reliable' to the parent SPM, then an explicit FORGET message must be sent to the parent SPM to cause it to release the TP. Step 710 sends this explicit FORGET message, after which the TP at this SPM is released at step 712.

It is to be understood that the above described arrangements are merely illustrative of the application of principles of the invention and that other arrangements may be devised by workers skilled in the art without departing from the spirit and scope of the invention. For example, for purposes of the claims, it is understood and intended that the resources in each of the nodes, as disclosed herein, can and should be interpreted as nodes.

We claim:

1. In a distributed transaction network having a plurality of nodes forming a network tree and using a two-phase syncpoint protocol initiated by an initiator node of the network to commit or backout transactions at the nodes, a method of improving the response time of transaction processing in the network, comprising the steps of:
    at each node which is not the initiator node and in response to a first phase syncpoint command from a parent node to prepare to commit a transaction, determining if this node is reliable or unreliable and if all nodes descending from this node in the tree are reliable or unreliable, wherein a reliable node cannot make a unilateral decision to commit or backout the transaction irrespective of whether a second phase syncpoint command is a commit or backout, and an unreliable node can make such a unilateral decision,
    informing the parent node in the tree that this node is reliable if it and all said descendant nodes are reliable, otherwise informing the parent node that this node is unreliable, and
    in response to a second phase syncpoint command from the parent node to commit or backout the transaction, propagating the second phase command to child nodes in the tree, if any,
    initiating the second phase syncpoint operations, and then,
    if this node and all child nodes are reliable, releasing the transaction at this node without waiting for acknowledgements of completion of the second phase command by the child nodes.

2. In a distributed transaction network having a plurality of nodes each capable of performing some operation on a transaction and using a two-phase syncpoint protocol to commit or backout transactions in the network, a method of improving the response time of transaction processing in the network, comprising the steps of:
    at each node involved in a transaction, all such nodes involved in a transaction forming a syncpoint network, and in response to a decision to commit the transaction at a syncpoint initiating node or to a prepare to commit command from a parent node of this node,
    determining from information included at this node and from information obtained from all nodes that are descendants of this node in the syncpoint network if a unilateral decision can be made by this node or any said descendent node to commit or backout the transaction irrespective of whether a subsequent network decision is to backout or commit the transaction,
    informing the parent node, if any, that this node is reliable or unreliable, wherein reliable means that neither this node nor any of said descendant nodes can make a said unilateral decision, and unreliable means that this node or one or more of said descendant nodes have indicated they may make such a said unilateral decision,
    if this node is the syncpoint initiator, making a decision to commit or backout the transaction and transmitting a resultant commit or backout command to child nodes,
    if this node is not the syncpoint initiator, waiting for a commit or backout command from the parent node and propagating the commit or backout command to child nodes, if any, and
    if this node is reliable, releasing the transaction at this node in response to the commit or backout decision or command, without waiting for acknowledgements of completion of the commit or backout command by the child nodes.

3. The method of claim 2 further comprising the step of
    if this node can make a unilateral commit or backout decision and all said descendant nodes are reliable, releasing the transaction at this node after completing processing of the commit or backout command at this node.

4. The method of claim 2 further comprising the step of
    if this node cannot make a unilateral decision to commit or backout and one or more of said child nodes have indicated that they are unreliable, waiting for acknowledgements from all of said unreliable child nodes that they have completed processing of the commit or backout command before releasing the transaction at this node.

5. The method of claim 2 further comprising the step of:
    if this node is unreliable and is not the syncpoint initiating node, transmitting an acknowledgement message to the parent node when a decision is made to release the transaction at this node.

6. In a distributed transaction network having a plurality of nodes each capable of performing some operation on a transaction and using a two-phase syncpoint protocol to commit or backout transactions in the network, a method of improving the response time of transaction processing in the network, comprising the steps of:

initiating a transaction COMMIT syncpoint operation at one of the nodes, in response to the COMMIT operation at the initiating node, transmitting a PREPARE TO COMMIT message to each child node of the initiating node, and performing the following steps at each node in the network other than the node initiating the COMMIT operation, in response to a PREPARE TO COMMIT message, propagating the PREPARE TO COMMIT message to each child node of this node, waiting for response messages to the PREPARE TO COMMIT message from each said child node, said response messages containing an indication of whether or not the child node is reliable or unreliable, wherein reliable means that neither the responding node nor any descendant node of the child node can make a unilateral decision to commit or back-out the transaction irrespective of a subsequent network decision to backout or commit the transaction, and unreliable means that the responding node or one or more of its descendant nodes may make such a unilateral decision, determining from information included at this node if this node is reliable or unreliable, transmitting a response message to the parent node of this node, said response message including a reliable indication if this node and all its descendant nodes are reliable, said response message including an unreliable indication if this node or any of its descendants are unreliable, and in response to a subsequent COMMIT or BACKOUT message from the parent node, propagating the COMMIT or BACKOUT message to child nodes, if any, and releasing the transaction at this node without waiting for acknowledgements of completion of the COMMIT or BACKOUT message by the child nodes, if this node and all descendant nodes are reliable.

7. The method of claim 6 further comprising the step of if this node is unreliable and all said descendant nodes have indicated that they are reliable, waiting until this node has completed commit processing before releasing the transaction.

8. The method of claim 6 or claim 7 further comprising the step of:

if this node is reliable and one or more of said descendants have indicated that they are unreliable, waiting for acknowledgements from all of said unreliable descendant nodes that they have completed commit processing before releasing the transaction at this node.

9. The method of claim 8 further comprising the step of:

if this node or any descendant node is unreliable and this node is not the syncpoint initiating node, transmitting an acknowledgement message to the parent node when a decision is made to release the transaction at this node.

10. In a distributed transaction network having a plurality of nodes each capable of performing some operation on a transaction and using a two-phase syncpoint protocol to commit or backout transactions in the network, a method of improving the response time of transaction processing in the network, wherein each node comprises one or more transaction resources that perform transaction processing requiring subsequent syncpoint operations to commit or backout such transaction processing, said resources including a different resource representing a communication link to each child node, if any, of this node and therefore representing all nodes of the network descending from this node, a syncpoint manager for controlling transaction commit or backout operations, and a transaction program for sending transaction processing commands to the resources and for sending syncpoint commands to the syncpoint manager to initiate said syncpoint operations, wherein one of the syncpoint managers becomes a syncpoint initiator in response to an initial syncpoint message from its transaction program, said method comprising the following steps performed by the syncpoint manager at each node:

in response to a message from the transaction program at a node to commit a present transaction, transmitting a PREPARE TO COMMIT message to each resource of the syncpoint manager, and to the corresponding transaction program if the syncpoint manager is not the syncpoint initiator, waiting for AGREE or NOT AGREE responses from the resources to the PREPARE TO COMMIT messages, said AGREE or NOT AGREE messages including an indication that the sending resource is reliable or unreliable, wherein reliable means that the sending resource cannot make a unilateral decision to commit or backout the transaction irrespective of a subsequent decision to backout or commit the transaction, and unreliable means that the sending resource may make such a unilateral decision, storing each said reliable or unreliable indication, determining from said stored indications if all said resources are reliable, if this node is not the syncpoint initiator, transmitting an AGREE or NOT AGREE message including a reliability flag to the parent syncpoint manager via the communication link resource to the parent node and setting the reliability flag in the message to reliable if all said resources are reliable or setting the reliability flag to unreliable if any said resource is unreliable, and if this syncpoint manager is the syncpoint initiator, transmitting a COMMIT command or a BACKOUT command to each of its resources after receipt of AGREE or NOT AGREE messages from all of its resources, if this syncpoint manager is not the syncpoint initiator, then in response to receipt of a COMMIT or BACKOUT command from the parent syncpoint manager, propagating the COMMIT or BACKOUT command to each of its said resources, if all said resources are marked as reliable, then immediately after propagating the COMMIT or BACKOUT command to said resources, alerting the transaction program of successful completion of the COMMIT or BACKOUT operation, if any said resource is marked unreliable, waiting for an acknowledgement of completion of the COMMIT or BACKOUT command from each such each resource whose reliability indication is marked unreliable before alerting the transaction program of the successful or unsuccessful completion of the syncpoint operation, and thereafter sending an acknowledgement message to the parent syncpoint manager if this syncpoint manager is not the syncpoint initiator.

11. In a distributed transaction network having a plurality of nodes forming a network tree and using a two-phase syncpoint protocol initiated by an initiator node of the network to commit or backout transactions at the nodes, apparatus for improving the response time of transaction processing in the network, comprising:

first means at each node which is not the initiator node for detecting a first phase syncpoint command from a parent node to prepare to commit a transaction, second means responsive to the first means for determining if this node is reliable or unreliable and if all nodes descending from this node in the tree are reliable or unreliable, wherein a reliable node cannot make a unilateral decision to commit or backout the transaction irrespective of whether a second phase syncpoint command is a commit or backout, and an unreliable node can make such a unilateral decision, third means responsive to the second means for informing the parent node in the tree that this node is reliable if it and all said descendant nodes are reliable, fourth means responsive to the second means for informing the parent node that this node is unreliable if it or any of said descendant nodes are unreliable, and fifth means responsive to a second phase syncpoint command from the parent node to commit or backout the transaction for propagating the second phase command to child nodes in the tree, if any, and initiating the second phase syncpoint operations, and sixth means responsive to the second and fifth means for releasing the transaction at this node without waiting for acknowledgements of completion of the second phase command by the child nodes if this node and all child nodes are reliable.

12. In a distributed transaction network having a plurality of nodes each capable of performing some operation on a transaction and using a two-phase syncpoint protocol to commit or backout transactions in the network, apparatus for improving the response time of transaction processing in the network, comprising:

means at each node for initiating a syncpoint operation to commit a transaction by sending a prepare to commit command to child nodes, if any, in the tree, means responsive to the receipt of a prepare to commit command from a parent node in the tree for propagating the prepare to commit command to child nodes, if any, means responsive to the receipt of a prepare to commit command for determining if a unilateral decision can be made by this node or any descendent of this node to commit or backout the transaction irrespective of whether a subsequent network decision is to backout or commit the transaction, means for informing the parent node, if any, that this node is reliable or unreliable, wherein reliable means that neither this node nor any of said descendant nodes can make a said unilateral decision, and unreliable means that this node or one or more of said descendant nodes can make such a unilateral decision, means responsive to a commit or backout command from the parent node for propagating the commit or backout command to child nodes, if any, and for initiating commit or backout operations at this node, and means responsive to the initiating means for releasing the transaction at this node without waiting for acknowledgements of completion of the commit or backout command by the child nodes.

13. The apparatus of claim 12 further comprising:
means for releasing the transaction at this node after completing processing of the commit or backout command at this node, if this node is unreliable and all said descendant nodes are reliable.

14. The apparatus of claim 12 further comprising:
means responsive to the determining means for waiting for acknowledgements from all of said unreliable child nodes that they have completed processing of the commit or backout command, and
means responsive to the waiting means for releasing the transaction at this node.

15. The apparatus of claim 12 further comprising:
means for transmitting an acknowledgement message to the parent node substantially at the same time as the transaction is released at this node.

* * * * *